3,345,257
METHOD FOR COMBATTING
MICROORGANISMS
Dieter Duerr, Basel, Hans Aebi, Riehen, and Ludwig
Ebner, Stein, Aargau, Switzerland, assignors to Ciba
Limited, Basel, Switzerland, a company of Switzerland
No Drawing. Original application Dec. 31, 1962, Ser. No.
248,302. Divided and this application Jan. 20, 1964,
Ser. No. 344,518
Claims priority, application Switzerland, Jan. 19, 1962,
658/62
10 Claims. (Cl. 167—33)

This application is a division of my application Ser. No. 248,302, filed Dec. 31, 1962, and now abandoned.

The present invention provides a pest control agent containing, as the active ingredient, a thiazoline compound of the general formula

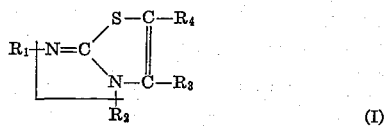

in which $R_1$ represents a phenyl radical which may be substituted by one or several halogen atoms, trifluoromethyl groups, lower alkyl radical or alkoxy radicals, or by the chlorophenoxy radical, or represents the allyl radical or an alkyl radical with at most 18 carbon atoms, $R_2$ represents a hydrogen atom, a lower alkyl radical or a lower dialkylamino group, $R_3$ represents a hydrogen atom, a lower alkyl or a phenyl group, and $R_4$ represents a hydrogen atom or the radical —$COOR_5$, where $R_5$ represents a lower alkyl radical, or a salt thereof with an acid and, if desired, a diluent, a solvent, a wetting agent, an emulsifier, an adhesive, a fertilizer or a further pest control agent.

Especially valuable are those preparations which contain as active ingredient a compound of the above general Formula I in which $R_1$ represents a phenyl group substituted by 1 to 2 trifluoromethyl groups, chlorine atoms, bromine atoms, lower alkyl or alkoxy groups or by the chlorophenoxy radical, or in which $R_1$ represents the allyl, dodecyl or octadecyl group. $R_2$ represents a lower alkyl radical or the dimethylamino group, with the proviso that the substituents $R_1$ and $R_2$ at the two nitrogen atoms may replace each other, $R_3$ represents a lower alkyl radical, or a hydrogen atom or the phenyl radical, and $R_4$ stands for a hydrogen atom or the group

—$COOC_2H_5$ or a salt thereof with an acid, more especially the hydrochloride, hydrobromide or perchlorate.

The synthesis of 2-iminothiazolines may be carried out by one of the following known methods:

(a) Reaction of a monosubstituted thiourea with an α-halogen-carbonyl compound and, possibly, subsequent alkylation of the reaction product, and (b) reaction of an N:N'-disubstituted thiourea with an α-halogen-carbonyl compound.

It is known to prepare 2-iminothiazolines by reacting phenylthiourea or para-chlorphenylthiourea with chloracetone and by reacting N:N'-diphenylthiourea with phenacylbromide. It is likewise known to react thiourea with α:β-dichlorodiethyl ether to form 2-aminothiazole or 2-imino-3:4-thiazoline.

In the past, the afore-mentioned reactions were carried out in a polar solvent, for example water or alcohol. However, it has proved advantageous to carry out the reaction in a non-polar solvent, preferably in toluene. When the reaction solution is cooled, the corresponding iminothiazolines separate out in the form of their hydrohalides.

The compounds of the general Formula I can be widely used for combating harmful organisms of the animal and plant kingdoms, for example they can be used for protecting plants, timber, a wide variety of industrial products and agricultural produce, as well as for protecting fibrous materials from harmful micro-organisms.

The new agents are suitable for combating harmful fungi, bacteria, acarides and insects and for controlling undesired plant growth.

As examples of the uses of the new compounds in plant protection there may be mentioned the treatment of plant seeds and of partially or wholly developed plants, and of the soil in which the plants grow, to protect them from harmful organisms, for example from harmful fungi, fungus spores, bacteria, nematodes and insects.

The compounds of the invention are especially suitable for combating genuine mildew, particularly in viniculture and horticulture, for example cucumber and apple mildew, and in this application the compound of the formula

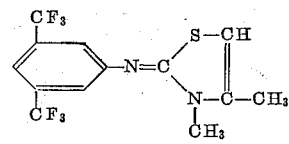

proves especially efficient.

A further sphere of use of the compounds of the Formula I and of their salts is the control of undesired plant growth.

The active ingredients to be used as herbicides may be used by themselves or in conjunction with other weed killers, for example tri-substituted or tetra-substituted aryl-alkyl ureas, halogenated phenoxy-alkanecarboxylic acids, halogenated benzoic acids or phenylacetic acids, halogenated fatty acids or salts, esters or amides thereof, with borax or other inorganic salts, for example abraum salts, with calcium cyanamide, urea or other fertilizers, or with pesticides, for example chlorinated hydrocarbons or phosphoric acid esters. They may also be combined with active compounds of basic reaction, for example tertiary or quaternary amines having a herbicidal effect. For example dodecyl hexamethyleneimine or salts thereof, or 1:1'-ethylene-2:2'-dipyridilium dibromide. It is also possible to incorporate in the preparations herbicidally active carbamates or thiolcarbamates or dithiocarbamic acid esters or a derivative of s-triazine.

Other compounds suitable for incorporation are herbicidally active heterocyclic compounds, for example 2-chlorobenzthiazole, 3-amino-1:2:4-triazole, maleic acid hydrazide, 3:5 - dimethyltetrahydro-1:3:5-thiadiazine-2-thione, and also simpler herbicides for example pentachlorophenol, dinitrocresol, dinitrobutylphenol, naphthylphthalamic acid or methyl isothiocyanate. The new preparations may further contain identifying agents and further bactericides, fungicides and nematocides.

The new preparations may also be used in combination with fertilizers, for example in admixture therewith.

The preparations of the invention are suitable both for selectively killing weeds underneath culture plants and, when used in suitable concentrations, for the total killing off and destruction of undesired plant growth.

Furthermore, the preparations of the invention display a fungicidal effect, for example on *Aspergillus niger*; a bactericidal effect, for example on *Staphylococcus aureus*; an insecticidal effect, for example on aphids or an ovicidal effect, for example on the meal moth (Ephestia Kühniella).

For preparing solutions of the compounds of the general Formula I used as active principle for combating vegetable and animal pests, suitable for direct spraying there may be used, for example, organic solvents boiling above 100° C., such as diesel oil or kerosene, coal tar oils and oils of vegetable or animal origin, and also hydrocarbons for example alkylated naphthalenes, or tetrahydronaphthalene, if desired in combination with xylene mixtures, cyclohexanols, ketones, also chlorinated hydrocarbons for example tetrachloroethane, trichloroethylene or tri- and tetra-chlorobenzenes.

When the compound to be used is soluble in water (for example in the form of one of its salts), aqueous forms of application are prepared by direct solution in water, or from emulsion concentrates, pastes or wettable spray powders by addition of water. Suitable emulsifiers or dispersants are non-ionic products, for example condensates from ethylene oxide with aliphatic alcohols, amines or carboxylic acids containing a long-chain hydrocarbon radical of about 10 to 30 carbon atoms, for example the condensation product from Octadecyl alcohol with 25 to 30 mols of ethylene oxide,
Or soybean fatty acid with 30 mols of ethylene oxide,
Or commercial oleylamine with 15 mols of ethylene oxide,
Or dodecylmercaptan with 12 mols of ethylene oxide.

From among the anionic emulsifiers that may be used there may be mentioned the sodium salt of dodecyl alcohol sulfuric acid ester, the sodium salt of dodecylbenzenesulfonic acid, the potassium or triethanolamine salt of oleic or abietic acid or of mixtures of these acids, and the sodium salt of a petroleum-sulfonic acid.

Suitable cationic dispersants are quaternary ammonium compounds, for example cetyl pyridinium bromide, or dihydroxy-ethylbenzyl dodecyl ammonium chloride.

For the manufacture of dusting and scattering agents there may be used as solid vehicles talcum, koalin, bentonite, calcium carbonate, calcium phosphate, or coal, cork meal and wood meal or other materials of vegetable origin. It is also of great advantage to manufacture the preparations in the form of granulates. The various forms in which the new compounds are used may contain the usual additives that improve the dispersion, adhesion, stability towards rain or the penetration. As such substances there may be mentioned fatty acids, resins, glue, casein or, for example, alginates.

Another object of the present invention are the new compounds of the general formula

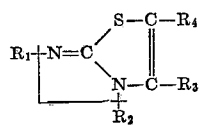

in which $R_1$ represents an allyl radical, the dodecyl radical or a phenyl radical substituted by at least 2 halogen atoms or lower alkyl groups or by one or several trifluoromethyl groups or by lower alkoxy groups or by the chlorophenoxy radical, $R_2$ represents a hydrogen atom, a lower alkyl group or a lower dialkylamino group, with the proviso that the substituents $R_1$ and $R_2$ at the two nitrogen atoms may replace each other, $R_3$ represents a hydrogen atom, a lower alkyl radical or a phenyl group, $R_4$ represents a hydrogen atom or the radical —$COOR_5$ where $R_5$ represents a lower alkyl group, or their salts with acids, as well as processes for the manufacture of these new compounds by as such known methods.

The following examples illustrate the invention, the parts and percentages being by weight.

EXAMPLE 1

(1) 2 - (3:5 - di-trifluoromethyl-phenyl)-imino-3:4-dimethylthiazoline of the formula

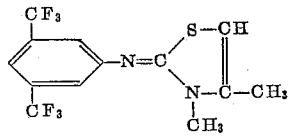

was prepared in the following manner:

A suspension of 81.5 g. of N-(3:5-di-trifluoromethyl-phenyl)-N'-methylthiourea in 2 to 4 times its own weight of toluene was heated to 90° C. to 25 g. of chloracetone were then added dropwise and stirred in while a rise in temperature was observed and droplets of water were formed. When all had been added, the reaction was completed by stirring the mixture for 15 minutes at the boil. The mixture was then allowed to cool, whereupon the hydrochloride of the reaction product settled out in the form of a viscid oil which quickly solidified when the wall of the vessel was scratched with a glass rod. The toluene was removed from this crystalline mass, the residue taken up in a small amount of hot alcohol and the solution was filtered. Ether was added to the warm alcoholic filtrate until a slight turbidity appeared, and the batch was then kept in a refrigerator, whereupon the hydrochloride of the reaction product settled out in pure form as an almost colorless, faintly yellowish crystalline substance which was filtered off, washed with ether and dried under vacuum.

The yield of hydrochloride was 65% of the theoretical yield; a further amount of the product can be obtained from the mother liquors on addition of ether.

The transformation of the hydrochloride into the free base was achieved as follows: 1 part of the hydrochloride was stirred with 1 part of water and 3 to 4 parts of ether. A slight excess of approximately 3-normal sodium hydroxide solution was added dropwise to this mixture, and the ethereal layer was separated in a separating funnel, dried over sodium sulfate and the ether was evaporated; the residue was then recrystallized from dilute alcohol.

|  | Hydrochloride | Free base |
|---|---|---|
| Melting point | 219–223° C. with decomposition. | 87° C. |
| Analysis | $C_{13}H_{11}N_2ClSF_6$ | $C_{13}H_{10}N_2SF_6$ |
| Calculated | 7.44% N | 45.88% C; 2.96% H; 8.23% N. |
| Found | 7.67% N | 46.2% C; 3.0% H; 8.2% N. |

The following further compounds were manufactured by the method described under (1) above:

(2) 2 - (para - chlorophenyl) - imino - 3:4 - dimethyl-thiazoline of the formula

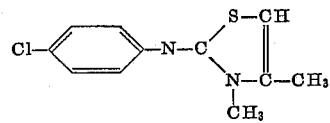

by reacting 100 g. of N-para-chlorophenyl-N'-methylthiourea with 41 g. of chloroacetone.

|  | Hydrochloride (×1H₂O) | Free base |
|---|---|---|
| Melting point | 193–195° C | 67–68° C. |
| Analysis | $C_{11}H_{14}ON_2Cl_2S$ | $C_{11}H_{11}N_2ClS$. |
| Calculated | 9.6% N | 55.34% C; 4.64% H; 11.78% N. |
| Found | 9.6% N | 55.14%; 4.62%; 11.94%. |

Yield of hydrochlorides: 85% of the theoretical.

(3) 2 - (meta - trifluoromethylphenyl) - imino-3:4-dimethylthiazoline of the formula

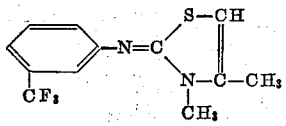

from 58.5 g. of N-meta-trifluoromethylphenyl-N'-methylthiourea and 26.5 g. of chloracetone.

Yield of hydrochloride: 53% of the theoretical.

|  | Hydrochloride |
| --- | --- |
| Melting point | 189–200° C. |
| Analysis | $C_{12}H_{12}N_2ClSF_3$. |
| Calculated | 46.68% C; 3.92% H; 9.07% N. |
| Found | 46.44% C; 4.10% H; 8.99% N. |

(4) 2-phenylimino-3:4-dimethylthiazoline of the formula

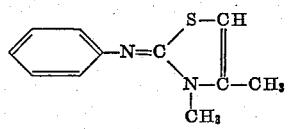

from 60 g. of N-phenyl-N'-methylthiourea and 33.3 g. of chloracetone. Yield of hydrochloride: 87% of the theoretical.

Melting point, 72–74°.

Analysis.—$C_{11}H_{12}N_2S$. Calculated: 64.67% C; 5.92% H; 13.71% N. Found: 64.54% C; 5.94% H; 13.55% N.

(5) 2 - (3:4 dichlorophenyl)-imino-3:4-dimethylthiazoline of the formula

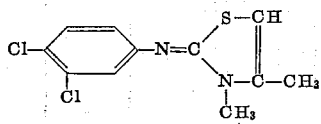

from 90 g. of 3:4-dichlorophenyl-N'-methylthiourea and 35.2 g. of chloracetone.

Yield of hydrochloride: 87% of the theoretical.

|  | Hydrochloride | | | Free base | | |
| --- | --- | --- | --- | --- | --- | --- |
| Melting point | 193–205° C. | | | 68.5–69.5° C. | | |
| Analysis | $C_{11}H_{11}N_2SCl_3$ | | | $C_{11}H_{10}N_2Cl_2S$ | | |
|  | C | H | N | C | H | N |
| Calculated, percent | 42.67 | 3.58 | 9.05 | 48.36 | 3.69 | 10.25 |
| Found, percent | 43.0 | 3.7 | 9.1 | 48.16 | 3.76 | 10.48 |

(6) 2-allylimino-3:4-dimethylthiazoline of the formula

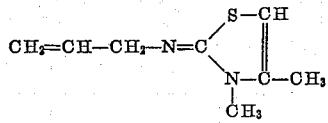

from 60 g. of N-allyl-N'-methylthiourea and 42.5 g. of chloracetone in 150 ml. of toluene.

Yield: 72% of the theoretical.

Boiling point: 80° C. under 0.04 mm. Hg pressure.

Analysis.—$C_8H_{12}N_2S$. Calculated: 16.65% N. Found: 16.8% N.

(7) 2 - (meta - trifluoromethylphenyl)-imino-3-ethyl-4-methylthiazoline of the formula

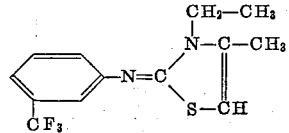

from 100 g. of N-3-trifluoromethylphenyl-N'-ethylthiourea and 41.2 g. of chloracetone in 200 ml. of toluene.

Yield of hydrochloride: 77% of the theoretical.

Melting point: 183–193° C.

Analysis.—$C_{13}H_{14}N_2ClSF_3$. Calculated: 48.5% C; 4.35% H; 8.7% N. Found: 48.8% C; 4.4% H; 8.6% N.

(8) 2 - (3:4 - dichlorophenyl)-imino-3-ethyl-4-methylthiazoline of the formula

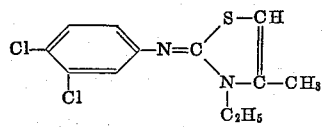

from 24.9 g. of N-3:4-dichlorophenyl-N'-ethylthiourea and 9.5 g. chloracetone in 100 ml. of toluene.

Yield of hydrochloride: 24 g.

Melting point: 170–176° C.

Analysis.—$C_{12}H_{13}N_2SCl_3$. Calculated: 44.53% C; 4.05% H; 8.66% N. Found: 44.60% C; 4.13% H; 8.61% N.

(9) 2 - (3:4-dichlorophenyl)-imino-3-methylthiazoline of the formula

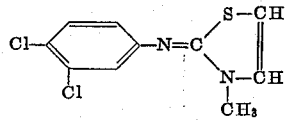

from 30 g. of N-3:4-dichlorophenyl-N'-methylthiourea and 18.5 g. α:β-dichlorodiethyl ether in 100 ml. of aqueous toluene.

Yield of hydrochloride: 20 g.

Melting point: 191–199° C.

Analysis. — $C_{10}H_9N_2SCl_3$. Calculated: 9.48% N; 10.85% S. Found: 9.50% N; 10.79% S.

(10) 2 - phenylimino - 3-dimethylamino - 4-methylthiazoline of the formula

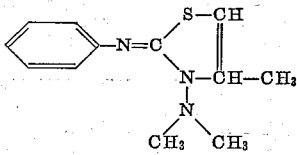

from 24 g. of 1:1-dimethyl-4-phenylthio-semicarbazide and 12 g. of chloracetone in n-propanol, precipitated by adding ether.

Yield of hydrochloride: 24.5 g.

Melting point: 176–191° C.

Analysis. — $C_{12}N_{16}N_3SCl$. Calculated: 53.42% C; 5.98% H; 15.58% N. Found: 53.42% C; 6.29% H; 15.51% N.

(11) 2 - meta - trifluoromethylphenyl-imino-3-methylthiazoline of the formula

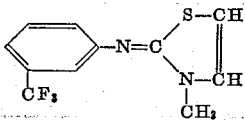

from 30 g. of N-meta-trifluoromethylphenyl-N'-methylthiourea and 18.5 g. of 1:2-dichlorodiethyl ether in 100 ml. of aqueous toluene.

Yield: 23 g. of thiazoline free from hydrochloric acid, boiling at 138–139° C. under 0.03 mm. Hg pressure.

Analysis.—$C_{11}H_9N_2SF_3$. Calculated: 51.16% C; 3.51% H; 10.85% N. Found: 50.90% C; 3.48% H; 10.60% N.

(12) 2-phenylimino-3-isopropyl-4-phenylthiazoline of the formula

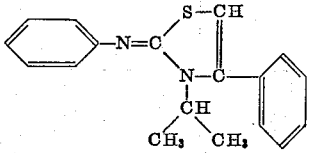

from 23.4 g. of N-phenyl-N'-isopropylthiourea and 23.9 g. of phenacylbromide in 100 ml. of toluene.

Yield: 37 g. of hydrobromide melting at 196–200° C.
Analysis. — $C_{18}H_{19}N_2SBr$. Calculated: 57.60% C; 5.10% H; 7.46% N. Found: 57.45% C; 5.07% H; 7.47% N.

(13) 2 - (meta-toluyl)-imino-3:4-dimethylthiazoline of the formula

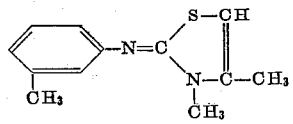

from 36 g. of N-meta-toluyl-N'-methylthiourea and 18.6 g. of chloracetone.
Yield: 20 g. of thiazoline free from hydrochloric acid, boiling at 156° C. under 0.2 mm. Hg pressure, melting at 48–50° C.
Analysis.—$C_{12}H_{14}N_2S$. Calculated: 66.02% C; 6.46% H; 12.83% N. Found: 65.90% C; 6.43% H; 12.83% N.

(14) 2-(meta-chlorophenyl)-imino - 3:4 - dimethyl-5-carboxyethylthiazoline of the formula

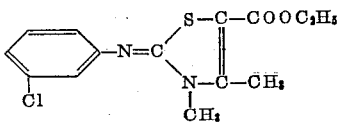

from 30 g. of N-meta-chlorophenyl-N'-methylthiourea and 24.6 g. of monochloroacetic acid ester.
Yield: 47% of thiazoline free from hydrochloric acid.

|  | Thiazoline | Hydrochloride |
|---|---|---|
| Melting point | 89–91° C. | 137–145° C. |
| Analysis | $C_{14}H_{16}O_2N_2SCl$ | $C_{14}H_{16}O_2N_2SCl_2$ |
| Calculated | 54.10% C; 4.86% H; 9.01% N | 48.42% C; 4.69% H |
| Found | 54.6% C; 5.1% H; 8.9% N | 48.5% C; 4.6% H |

The following compounds are accessible in a similar manner:

| | Formula | Melting Point, ° C. | Percentages found (calculated values in parentheses) | | | |
|---|---|---|---|---|---|---|
| | | | C | H | N | S |
| 15 | Cl-phenyl(Cl)-N=C-S-C-COOC₂H₅ ring with N-CH₃, C-CH₃ .HCl | 137 | 43.8 (44.05) | 4.25 (3.96) | | |
| 16 | Cl-phenyl(Cl)-N=C-S-CH ring with N-CH, CH₃ .HCl | 191–199 | | | 9.50 (9.48) | 10.79 (10.85) |
| 17 | phenyl(Cl)-N=C-S-CH ring with N-C, CH₃ CH₃ .HCl | 214 | 47.7 (48.01) | 4.4 (4.40) | 10.3 (10.18) | |
| 18 | phenyl(OCH₃)-N=C-S-CH ring with N-C, CH₃ CH₃ .HCl | ¹192–195 | 52.9 (53.23) | 5.7 (5.58) | | |

¹ With decomposition.

| | Formula | Melting Point, ° C. | Percentages found (calculated values in parentheses) | | | |
|---|---|---|---|---|---|---|
| | | | C | H | N | O |
| 19 | phenyl(OCH₃)-N=C-S-CH ring with N-C, CH₃ CH₃ | 118–120 | 61.5 (61.51) | 6.3 (6.02) | | 7.1 (6.83) |
| 20 | phenyl-N=C-S-CH ring with N-C-CH₃, CH(CH₃)₂ .HClO₄ | 148 | 46.90 (46.92) | 5.18 (5.15) | 8.51 (8.42) | |
| 21 | phenyl(CF₃)-N=C-S-CH ring with N-CH, H .HCl | 98–107 | 42.80 (42.79) | 3.19 (2.87) | 10.06 (9.98) | |

| No. | Formula | Melting Point, °C. | Boiling Point, °C. | C | H | N |
|---|---|---|---|---|---|---|
| 22 | Cl—C₆H₄—N=C(S—CH=CH—N(CH₃))·HCl | ¹ 238 | | 46.15 (45.99) | 3.79 (3.86) | 10.55 (10.73) |
| 23 | CH₃(CH₂)₁₁—N=C(S—CH=CH—N(CH₃)) | | 148–150°, 0.04 mm | | | 10.5 (10.43) |
| 24 | CH₃—(CH₂)₁₁—N=C(S—CH=C(CH₃)—N(CH₃)) | | 130°, 0.03 mm | 68.7 (68.87) | 10.9 (10.88) | |

¹ With decomposition.

| No. | Formula | Melting Point, °C. | C | H | N |
|---|---|---|---|---|---|
| 25 | Br—C₆H₄—N=C(S—CH=CH—N(CH₃))·HCl, with extra CH₃ | ¹ 211–213 | 41.08 (41.33) | 4.00 (3.78) | 8.48 (8.76) |
| 26 | C₄H₉O—C₆H₄—N=C(S—CH=CH—N(CH₃)) | Oil | 63.8 (64.09) | 7.0 (6.92) | 10.4 (10.68) |
| 27 | Cl—C₆H₄—C—C₆H₄—N=C(S—CH=C—N(CH₃)CH₃) | Oil | 61.5 (61.72) | 4.8 (4.57) | 8.2 (8.47) |
| 28 | (3,4-Cl₂)C₆H₃—N=C(S—CH=C(C₆H₅)—N(CH₃))·HBr | ¹ 235–238 | 46.3 (46.17) | 3.3 (3.15) | 6.8 (6.73) |

¹ With decomposition.

EXAMPLE 2

(a) A wettable powder was prepared containing 20% of the active principle mentioned under (1) in Example 1 (used in the form of its hydrochloride), as well as 80% of a mixture of kaolin, finely dispersed silicic acid and an emulsifier mixture consisting of the sodium salt of dodecyl alcohol sulfuric acid ester and an adduct from ethylene oxide and tertiary octylphenol. The mixture can be diluted in any desired proportion with water, whereupon it forms a stable dispersion.

(b) A solution of 20 parts of the compound (5) of Example 1 in 70 parts of xylene was mixed with 10 parts of a dispersing and emulsifying agent consisting of a mixture of the sodium salt of dodecyl alcohol sulfuric acid ester and an adduct from ethylene oxide and tertiary octylphenol. The solution can be mixed with water in any desired proportion to form a milky dispersion.

EXAMPLE 3

Fungicidal action (a) Cotyledons of *Cucumis pepo* were treated with a spray broth as described in Example 2(a) containing 0.2% of the active principle described in Example 1 (under 1).

2 days after the treatment, these cotyledons were infected with spores of *Erysiphe cichoriacearum*.

12 days after the infection, it was observed that the plants treated with the spray broth according to Example 2(a) were not attacked by powdery mildew, whereas the untreated control plants were strongly infected.

(b) In the test for their fungicidal effect against *Aspergillus niger* in the plate test, the compounds listed in Example 1 under 1 to 6, 8, 9, 11, 13, 16, 21 and 22 displayed a good action, for example when applied in an amount of 0.2% of active principle.

EXAMPLE 4

Herbicidal action

A. PRE-EMERGENCE

The following types of plant were grown in pots in a greenhouse: *Setaria italica, Sinapis alba, Medicago sativa, Lepidium sativum* and *Calendula chrysantha*. 2 days afterwards the surface of the earth in the seeded pots was treated with an emulsion according to Example 2(b), the amount of active principle used being equivalent to 10 kg. of active principle per hectare. 3 weeks after the treatment, the aforesaid plants had either not germinated at all or had died off completely after germination. Medicago was so much damaged that normal further development had become impossible.

B. POST-EMERGENCE

Earthenware pots were prepared as described under (a) above and seeded with the same kinds of plant. The treatment with the same active principle as under (a) used in an equal amount was carried out when the plants had developed the first pair of true leaves, that is to say about 9 to 11 days after seeding. 3 weeks after the treatment, all the aforementioned types of plant had died off completely.

(c) Good effects against weeds were also achieved by using spray broths as described under (a) or (b) above which contained one of the following compounds described in Example 1: 2, 3, 4, 6, 8, 9, 11, 13, 15 to 20, 22 to 28.

What is claimed is:

1. The method for combating harmful microorganisms, wherein there is applied to the areas whereon the microorganism combating effect is desired, a biocidal amount of a member selected from the group consisting of (A) a compound of the formula

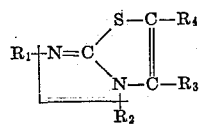

wherein $R_1$ is a member selected from the group consisting of (a) phenyl, phenyl substituted in at most 2 places by a member selected from the group consisting of chlorine, $CF_3$, lower alkyl, lower alkoxy and chlorophenoxy, (b) allyl and (c) alkyl with at most 18 carbon atoms, $R_2$ is a member selected from the group consisting of hydrogen, lower alkyl and lower dialkylamino, $R_3$ is a member selected from the group consisting of hydrogen, lower alkyl and phenyl, $R_4$ is a member selected from the group consisting of hydrogen, and —$COOR_5$, where $R_5$ is lower alkyl, and (B) a salt of a compound set forth above under (A) selected from the group consisting of hydrochloride, hydrobromide and perchlorate.

2. A method as claimed in claim 1, wherein there is used a biocidal amount of the compound of the formula

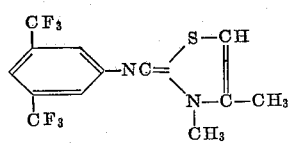

3. A method as claimed in claim 1, wherein there is used a biocidal amount of the compound of the formula

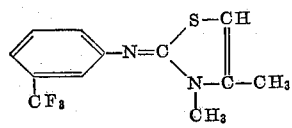

4. A method as claimed in claim 1, wherein there is used a biocidal amount of the compound of the formula

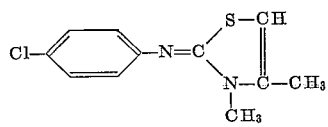

5. A method as claimed in claim 1, wherein there is used a biocidal amount of the compound of the formula

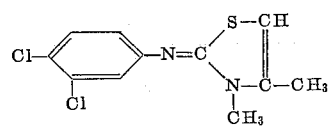

6. A method as claimed in claim 1, wherein there is used a biocidal amount of the compound of the formula

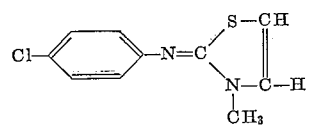

7. A method as claimed in claim 1, wherein there is used a biocidal amount of the compound of the formula

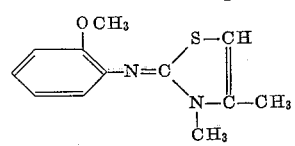

8. A method for combating harmful fungi wherein there is applied to the area whereon the fungi combating effect is desired, a fungicidal amount of the compound of the formula

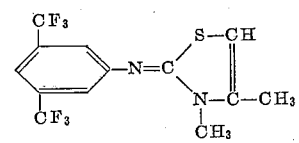

9. The method for combating insects, wherein there is applied to the areas whereon the insect combating effect is desired, an insecticidal amount of a member selected from the group consisting of (A) a compound of the formula

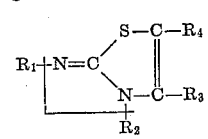

wherein $R_1$ is a member selected from the group consisting of (a) phenyl, phenyl substituted in at most 2 places by a member selected from the group consisting of chlorine, $CF_3$, lower alkyl, lower alkoxy and chlorophenoxy, (b) allyl and (c) alkyl with at most 18 carbon atoms, $R_2$ is a member selected from the group consisting of hydrogen, lower alkyl and lower dialkylamino, $R_3$ is a member selected from the group consisting of hydrogen, lower alkyl and phenyl, $R_4$ is a member selected from the group consisting of hydrogen, and —$COOR_5$, where $R_5$ is lower alkyl, and (B) a salt of a compound set forth above under (A) selected from the group consisting of hydrochloride, hydrobromide and perchlorate.

10. The method for combating acarides, wherein there is applied to the areas whereon the acaricidal combating effect is desired, an acaricidal amount of a member selected from the group consisting of (A) a compound of the formula

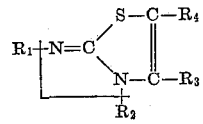

wherein $R_1$ is a member selected from the group consisting of (a) phenyl, phenyl substituted in at most 2 places by a member selected from the group consisting of chlorine, $CF_3$, lower alkyl, lower alkoxy and chlorophenoxy, (b) allyl and (c) alkyl with at most 18 carbon atoms, $R_2$ is a member selected from the group consisting of hydrogen, lower alkyl and lower dialkylamino, $R_3$ is a member selected from the group consisting of hydrogen, lower alkyl and phenyl, $R_4$ is a member selected from the group consisting of hydrogen, and —$COOR_5$, where $R_5$ is lower alkyl, and (B) a salt of a compound set forth above under (A) selected from the group consisting of hydrochloride, hydrobromide and perchlorate.

References Cited
UNITED STATES PATENTS

| | | | |
|---|---|---|---|
| 1,961,840 | 6/1934 | Bolton | 167—33 |
| 2,902,356 | 9/1959 | Luckenbaugh | 71—2.5 |
| 3,119,831 | 1/1964 | Homer | 71—2.5 X |

OTHER REFERENCES

Hunter et al., J. Chem. Soc. (London), 1934, pp. 1175 to 1177.

ALBERT T. MEYERS, *Primary Examiner*.

J. O. THOMAS, S. ROSEN, *Examiners*.

S. FRIEDMAN, *Assistant Examiner*.

UNITED STATES PATENT OFFICE
CERTIFICATE OF CORRECTION

Patent No. 3,345,257                          October 3, 1967

Dieter Duerr et al.

It is hereby certified that error appears in the above numbered patent requiring correction and that the said Letters Patent should read as corrected below.

Column 4, line 14, before "25" strike out "to"; lines 56 to 61, the formula should appear as shown below instead of as in the patent:

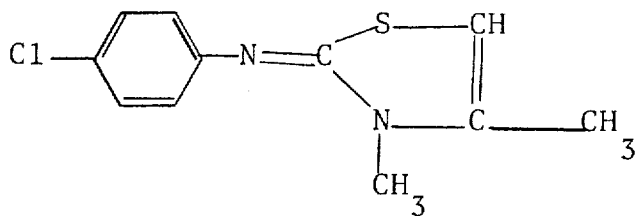

line 75, for "hydrochlorides" read -- hydrochloride --; column 11, lines 60 to 65, the formula should appear as shown below instead of as in the patent:

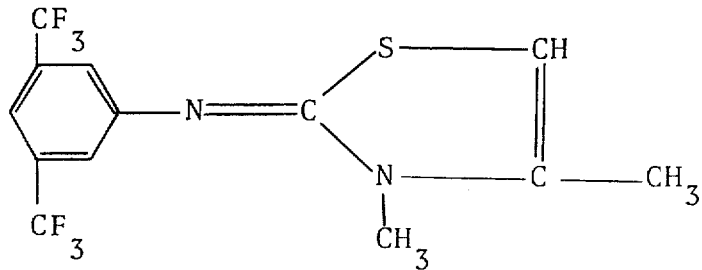

Signed and sealed this 22nd day of April 1969.

(SEAL)
Attest:

EDWARD M. FLETCHER, JR.                    EDWARD J. BRENNER
Attesting Officer                             Commissioner of Patents